No. 790,453. PATENTED MAY 23, 1905.
W. PADDEN.
THILL AND TONGUE SUPPORT.
APPLICATION FILED JULY 16, 1904.
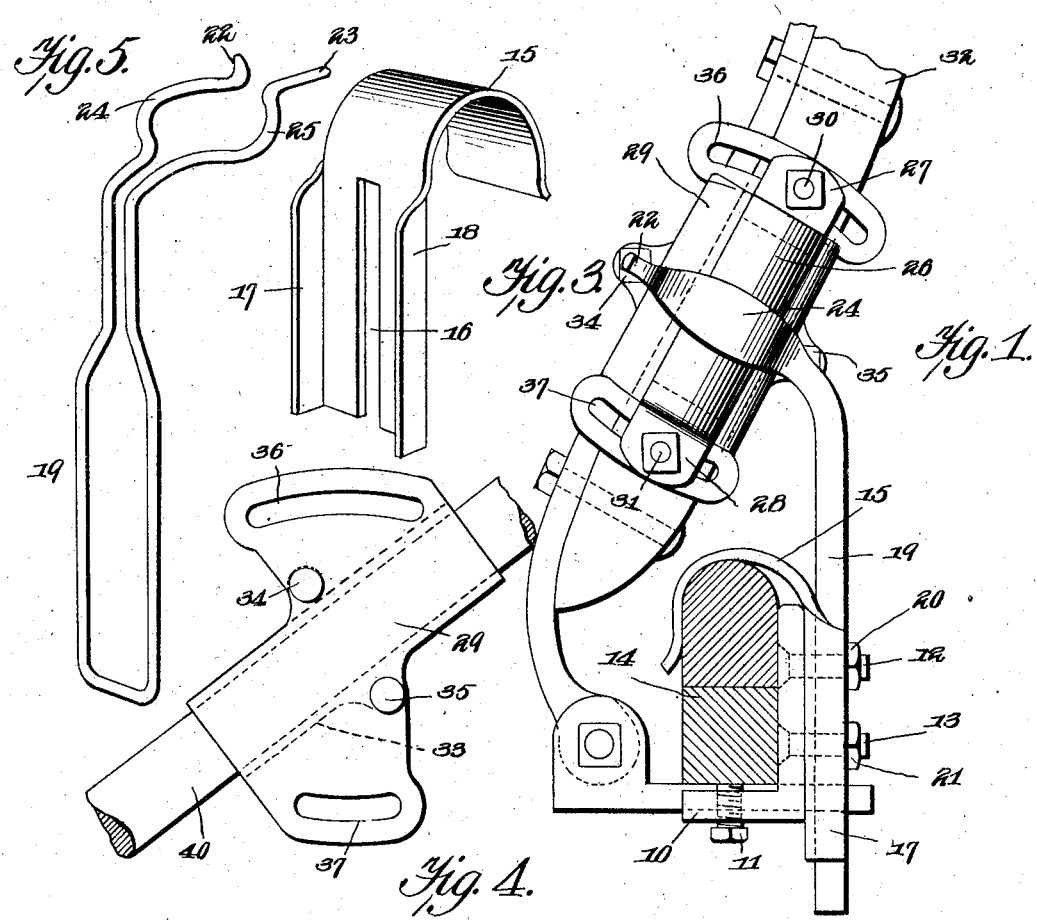
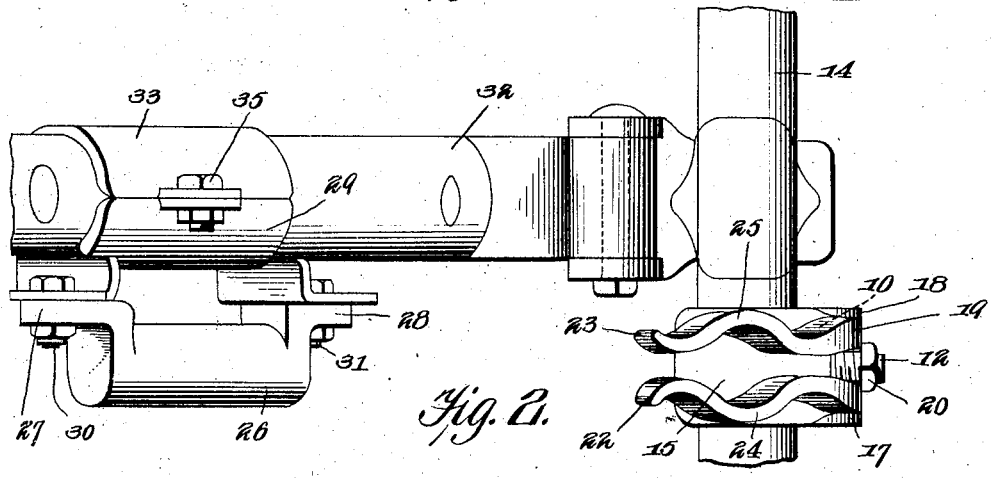
Witnesses
William Padden, Inventor
by C. A. Snow & Co.
Attorneys No. 790,453.

Patented May 23, 1905.

UNITED STATES PATENT OFFICE.

WILLIAM PADDEN, OF NORTH HUDSON, WISCONSIN.

THILL AND TONGUE SUPPORT.

SPECIFICATION forming part of Letters Patent No. 790,453, dated May 23, 1905.

Application filed July 16, 1904. Serial No. 216,859.

*To all whom it may concern:*

Be it known that I, WILLIAM PADDEN, a citizen of the United States, residing at North Hudson, in the county of St. Croix and State of Wisconsin, have invented a new and useful Thill and Tongue Support, of which the following is a specification.

This invention relates to attachments for buggies, carriages, and similar vehicles for supporting the thills or tongues in an elevated position when not in use, and has for its object to improve and simplify the construction and increase the efficiency and convenience of operation and produce a device of this character which may be readily adapted to any form or size of vehicle and adjusted to support the thills or tongue at any desired elevation.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claims made therefor.

In the drawings thus employed, Figure 1 is a sectional view of a portion of the forward axle and of one of the thills of a vehicle with the improvement applied and the thill coupled to the axle. Fig. 2 is a plan view of the same with the thill uncoupled. Fig. 3 is a perspective view of the adjustable axle-holding clip-plate detached. Fig. 4 is a plan view illustrating the construction of bracket which will be employed when the device is applied to the draft-tongues of vehicles. Fig. 5 is a perspective view illustrating a modified form of the adjustable resilient supporting-standard.

The improved device is comprised in two principal parts, one for attachment to the axle and one for attachment to the thills or tongues, as the case may be, each part being so constructed that it can be readily attached to any style or size of vehicle and adjusted to support the thills or tongue at any desired elevation. The part for attachment to the axle comprises an L-shaped member 10, having a set-screw 11 in one of its arms and spaced bolt-holes in its other arm, the inner ends of the bolt-holes being countersunk to receive the corresponding-shaped heads of bolts 12 13, so that when engaged with the axle (represented at 14) the bolts will not protrude and prevent close engagement with the same. A clip 15 is disposed to embrace the upper surface of the axle and extend partially over its front and likewise extend downward at the rear of the member 10 and provided with a longitudinal slot 16 to receive the bolts 12 13 and also provided with spaced flanges 17 18, between which a standard 19 in elongated U form is slidably disposed, the bolts 12 13 passing through the space between the sides of the standard and the whole clamped together by nuts 20 21. The upper ends of the side members of the standard 19 are bent forwardly at an angle and likewise with the extremities 22 23 bent laterally in opposite directions and likewise curved laterally in opposite directions adjacent to the laterally-bent ends, as at 24 25, to form a socket-like cavity or recess having yielding sides, into which an object may be guided by the reversely-inclined ends, as will be obvious. By this simple arrangement it will be obvious that the standard may be firmly clamped to the axle and the members 10 and 15 adjusted to fit any size of axle within the range of the slot 16 and the standard likewise adjusted vertically to any desired extent within the range of its length or the movement of the bolts 12 13 between its spaced sides to adapt it to varying sizes of thills and tongues, as hereinafter explained.

The part for attachment to the thill or tongue consists of a member 26, preferably in cylindrical form, for entrance into the socket formed by the curved portions 24 25 of the standard and provided with perforated lugs 27 28 at its ends to provide means for attachment to a clip 29, as by bolts 30 31. The clip is secured to the thill 32 by clamp-plate 33 and clamp-bolts 34 35. The clamp-plates 29 and 33 are curved to fit opposite sides of the thill and adapt themselves to the curvature and closely engage the same. The plate 29 is provided with transverse curved slots 36 37 for receiving the bolts 30 31 to provide for the adjustment of the catch member 26 to not only adapt it to the position of the standard and its yieldable socket, but also to control the elevation of the tongue or thill by setting the member 26 nearer to or farther from the point of contact with the standard-socket, so that it will engage the same at an earlier or later point in upward movement. Thus when applied to vehicles having a relatively great forward overhang of body and where the thill or tongue cannot be raised as high as in vehicles having a less overhang of body the catch member 26 can be adjusted to meet these conditions, as will be obvious. The upper slot 36 is longer than the slot 37 to provide for a greater range of movement of the upper end of the catch member, which will be required to secure the desired results.

Two of the standards and two of their corresponding catch members may be employed upon each pair of thills, if required; but generally one set will be sufficient to hold an ordinary pair of thills.

When employed for supporting vehicle-tongues, slightly differently formed clip-plates are generally employed for connecting the catch member 26, as when employed upon the tongues, as at 39, the catch is usually clamped to one of the braces (indicated at 40) and will require the plates to conform thereto, as will be obvious and as illustrated in Fig. 4; but this modification in the construction is not a departure from the principle of the invention, as the operation and results produced are the same.

By this simple arrangement it will be noted that with a vehicle equipped with the improved device herein described the elevation of the thills or tongue will cause the catch member 26 to enter the socket in the standard and be engaged thereby to retain the thills or tongue in elevated position, and then when the same is to be lowered it is only necessary to pull them down with sufficient force to overcome the resistance of forked standard, as will be obvious.

The parts will be as light as possible consistent with the strains to which they are to be subjected, their presence not being at all detrimental to the vehicle or detracting from its appearance, as they are not located at points where their presence will be noticeable.

The standard when formed of forged steel, as in Figs. 1, 2, and 3, is preferably widened at the curved portions forming the catch-sockets to increase the grip upon the catch member 26. If preferred, the standard may be of heavy steel wire bent into the required shape, as shown in Fig. 5.

Having thus described the invention, what is claimed is—

1. In a thill or tongue support for vehicles, a pair of interengaging members, one carried by a relatively fixed portion of the vehicle and the other by the thill or tongue, and means for adjusting one of said members at varying oblique angles with respect to the other.

2. In a thill or tongue support for vehicles, a pair of interengaging members carried one by the tongue or thill, and the other by a relatively fixed portion of the vehicle, one of said members being adjustable both longitudinally and at varying oblique angles with respect to the other.

3. In a thill or tongue support for vehicles, a pair of interengaging members, one of which is carried by a relatively fixed portion of the vehicle, and the other by the thill or tongue, both of said members being adjustable in the direction of their length, and one of the members being adjustable to varying oblique angles with respect to the other.

4. In a shaft or tongue support, an L-shaped member for engaging the vehicle-axle and provided with a set-screw beneath said axle, a slotted bar adjustably connected to said L-shaped member and having a hook-shaped terminal for bearing over said axle, a resilient U-shaped member having means for attachment to said L-shaped member and with its free ends bent laterally to form a resilient socket, and a member for adjustable attachment to the thill or tongue for engagement with said socket when the thill or tongue is elevated.

5. In a shaft or tongue support, an L-shaped member for engaging the axle and having a set-screw through one of its arms for bearing beneath the axle, a slotted bar adjustably connected to the other arm of said L-shaped member and having a hook-shaped terminal for bearing over said axle, said slotted bar having spaced flanges opposite its slotted portion, a substantially U-shaped member having means for connection to said slotted bar between the spaced flanges on the same and with its free ends extended laterally to form a resilient socket, and a member for adjustable attachment to the tongue or thill for yieldable engagement with said socket when the tongue or thills are elevated.

6. In a shaft or tongue support, an L-shaped member for engaging the axle and having a set-screw through one of its arms for bearing beneath the axle and spaced bolts in its other arm, a bar having a slot at one end for adjustably engaging said bolts and with its free end terminating in a hook for bearing over said axle, a substantially U-shaped member engaged by said spaced bolts and thereby clamped adjustably to said L-shaped member and slotted bar, the free ends of said U-shaped member extended laterally to form a resilient socket, and a member connected adjustably to the thill or tongue for yieldable engagement with said socket.

7. In a shaft or tongue support, a member substantially in elongated U shape having means for adjustable attachment to the vehicle-axle and with its free ends bent forwardly and extended laterally to form a resilient socket, a clip having means for detachable connection to the tongue or thill and provided with spaced transverse slots, and a bar having bolts for adjustably connecting the same to said clip by engaging said spaced slots and adapted to yieldably engage said resilient socket when the thill or tongue is elevated.

In testimony that I claim the foregoing as my own I have hereto affixed my signature in the presence of two witnesses.

WILLIAM PADDEN.

Witnesses:
PATRICK O'CONNELL,
W. F. BEHRENS.